United States Patent [19]
Powell, II et al.

[11] Patent Number: 5,309,480
[45] Date of Patent: May 3, 1994

[54] NON-COHERENT QUADRATURE DEMODULATION OF MSK SIGNALS

[75] Inventors: Clinton C. Powell, II, Boynton Beach; Joseph Boccuzzi, Lantana, both of Fla.

[73] Assignee: Motorola, Inc., Schaumburg, Ill.

[21] Appl. No.: 70,486

[22] Filed: Jun. 2, 1993

Related U.S. Application Data

[63] Continuation of Ser. No. 632,192, Dec. 21, 1990, abandoned.

[51] Int. Cl.$^5$ .............................................. H04L 27/14
[52] U.S. Cl. ........................................ 375/90; 375/47; 375/64; 329/302
[58] Field of Search ................. 375/55, 47, 45, 80, 375/82, 87, 90, 39, 64; 332/100; 329/300, 302

[56] References Cited

U.S. PATENT DOCUMENTS

| | | | |
|---|---|---|---|
| 3,142,723 | 7/1964 | Fleming | 375/47 |
| 4,503,472 | 3/1985 | Lacher | 375/55 |
| 4,592,072 | 5/1986 | Stewart | 375/55 |
| 4,596,023 | 6/1986 | Driver et al. | 375/55 |
| 4,656,646 | 4/1987 | Ryan | 375/47 |

FOREIGN PATENT DOCUMENTS 2124840 2/1984 United Kingdom .................. 375/90

OTHER PUBLICATIONS

IEEE Transactions on Communications, vol. COM-27, No. 10; Oct. 1979; "A 100 Mbit/s Prototype MSK Modem for Satellite Communications," Morihiro et al.; pp. 1512-1518.

Primary Examiner—Stephen Chin
Assistant Examiner—T. Ghebretinsae
Attorney, Agent, or Firm—Mansour G. Ghomeshi

[57] ABSTRACT

Briefly, according to the invention, a receiver (100) for receiving a carrier signal MSK (minimum shift keying) modulated with a bit stream of a digital information signal (302) is disclosed. The receiver (100) comprises a quadrature demodulator (128) for providing baseband quadrature demodulated signals (306 and 308). The quadrature demodulated (128) is coupled to an EXOR (126) for providing a decoded bit stream of the digital information signal (312) thereby avoiding complex decoder circuits. The quadrature demodulator (128) includes a pair of mixers (106 and 108) for quadrature mixing the received carrier signal and a pair of filters (114 and 118) for filtering the outputs of the mixers (106 and 108). The filters (114 and 118) are coupled to a pair of limiters (116 and 120) for limiting the filtered signals.

10 Claims, 3 Drawing Sheets

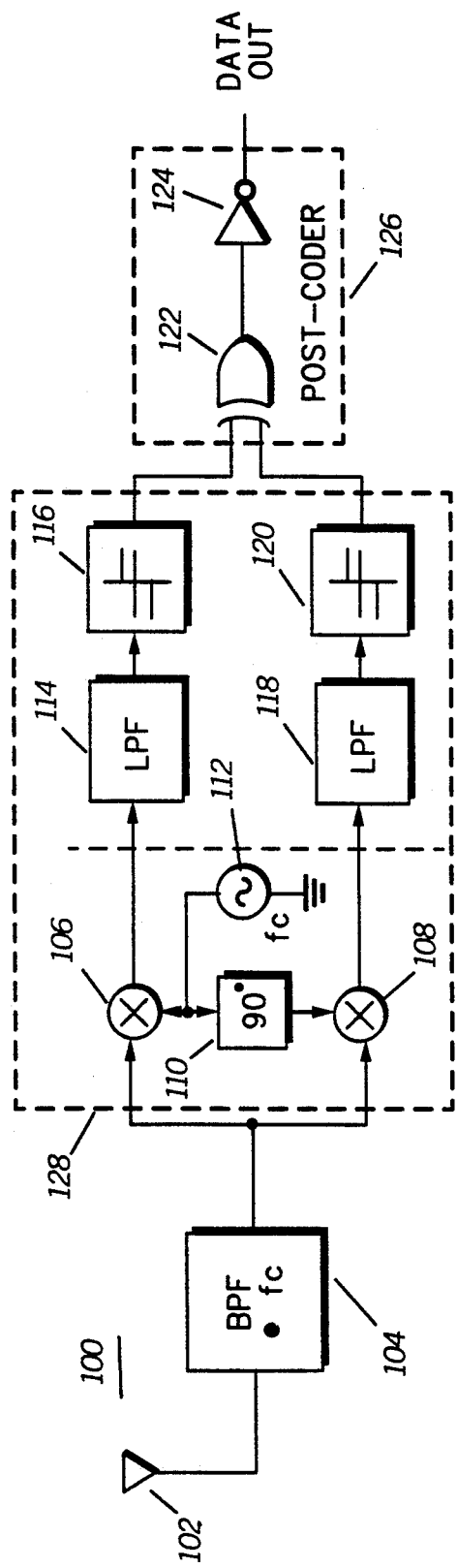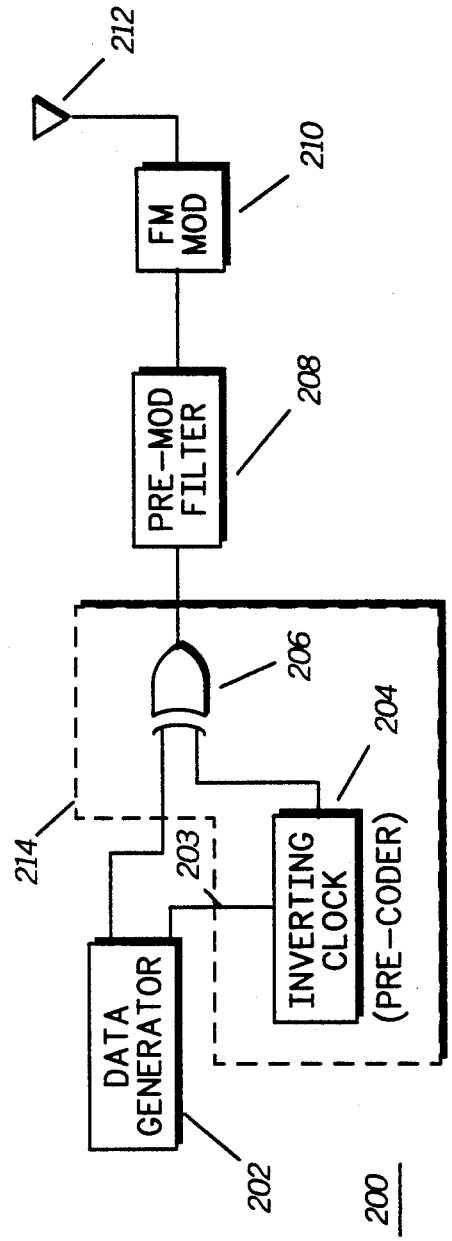

NON-COHERENT QUADRATURE DEMODULATION OF MSK SIGNALS

This is a continuation of application Ser. No. 07/632,192, filed on Dec. 21, 1990 and now abandoned.

TECHNICAL FIELD

This invention relates generally to receivers and is particularly directed towards receivers having quadrature demodulators for demodulating MSK (minimum shift keying) signals.

BACKGROUND

The ever increasing demand for digital transmission channels in the radio frequency (RF) band presents a potentially serious problem of spectral congestion and is likely to cause severe adjacent and co-channel interference problems. This has, in recent years, led to the investigation of a wide variety of techniques for solving the problem of spectral congestion. A modulation scheme known as minimum shift keying (MSK) addresses the spectral congestion problem effectively. MSK is a well known modulation technique to those skilled in the art. For more details on modulation and demodulation of MSK signals refer to Digital Transmission of Information by Richard E. Blahut.

In non-coherent detection of MSK modulated signals base band detection can be used. This technique uses a zero IF receiver including a quadrature demodulator for recovering the modulating digital information signal. Usually the I (in-phase) and Q (quadrature) channels are fed directly into a digital signal processing (DSP) where the demodulation and decision process is performed. The use of DSP increases the cost of the receiver and requires considerable space. As spectrally efficient as MSK has been, its wide spread use in high quantity production receivers such as pagers, has not yet been implemented due to the high cost of required DSP circuits. It is therefore clear that a need exists for a means to recover MSK signals without sacrificing receiver cost and space efficiency.

SUMMARY OF THE INVENTION

Briefly, according to the invention, a receiver for receiving a carrier signal MSK (minimum shift keying) modulated with a bit stream of a digital information signal is disclosed. The receiver comprises a quadrature demodulator means for providing baseband quadrature demodulated signals. This quadrature demodulated means is coupled to an EXOR means for providing a decoded bit stream of the digital information signal thereby avoiding complex decoder circuits. The quadrature demodulator means includes a means for quadrature mixing the received carrier signal and filter means for filtering the outputs of the mixers. The filter means are coupled to limiter means for limiting the filtered signals.

BRIEF DESCRIPTION OF THE DRAWINGS

FIG. 1 is a block diagram of a receiver 100 in accordance with the present invention.

FIG. 2 is a block diagram of a transmitter 200 in accordance with the present invention.

DETAILED DESCRIPTION OF THE PREFERRED EMBODIMENT

Figure 3:
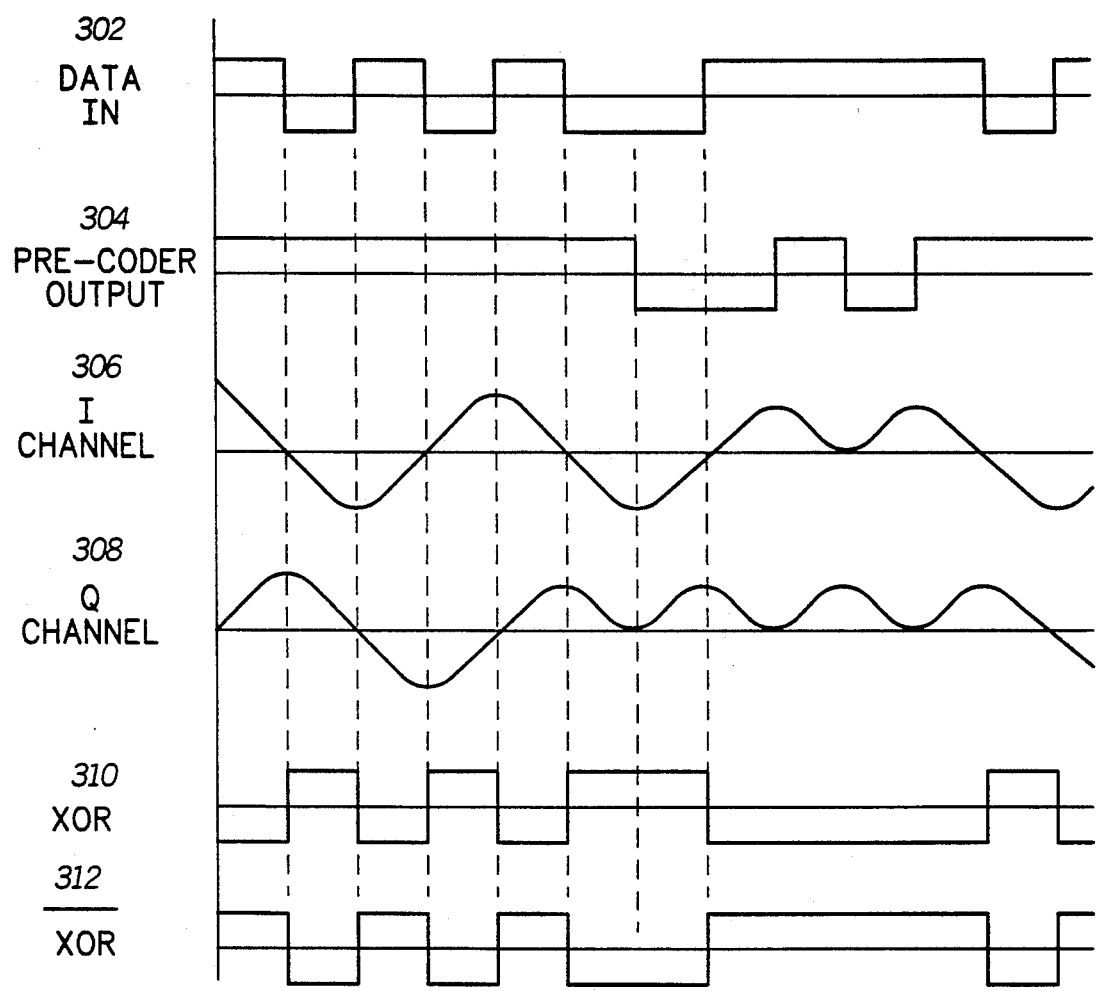
FIG. 3 is a series of diagrams of the bit stream of a digital information signal at various stages of the transmitter 200 and the receiver 100 in accordance with the principles of the present invention.

Referring first to FIG. 3, there is shown a series of waveforms at different stages of a transmitter 200 and a receiver 100. Waveform 302 is a bit stream of a digital information signal intended for transmission via the transmitter 200 and received via the receiver 100. A ZERO is represented by a negative one ($-1$) while a ONE is represented by a positive one ($+1$). Waveform 304 is the pre-coded version of signal 302 which is no more than the same with the even bits complemented. The waveform 306 and 308 are in respect the in-phase and quadrature baseband signals of the pre-coded bit stream 304. Waveform 310 is the recovered signal and waveform 312 is the inverted version of 310 which is identical to the original bit stream of the digital information signal 302.

Referring now to FIG. 1, a block diagram of a receiver 100 is shown in accordance with the principles of the present invention. An antenna 102 receives a carrier signal MSK (minimum shift keying) modulated with a bit stream of an encoded digital information signal. The received signal at the antenna 102 is coupled to a band pass filter (BPF) 104 centered at $f_c$, the frequency of the carrier signal. The filter 104 rejects harmonics and other noises associated with the transmission of the carrier signal. The output of the BPF 104 is branched to the first inputs of two substantially similar mixers 106 and 108 configured as a quadrature demodulator. The second inputs of the mixers 106 and 108 are connected in respect to the in-phase and quadrature signals of a reference oscillator 112 via a 90° phase shifter 110. The outputs of the mixers 106 and 108 are the in-phase and quadrature digital information signal at base band (DC) and twice the $f_c$. The base band signal at the output of the mixers 106 and 108 qualifies the receiver 100 as a zero IF receiver. The in phase and quadrature signals are commonly and collectively referred to as quadrature signals.

The outputs of the mixers 106 and 108 are connected to a series of substantially similar low pass filters (LPF) 114,118 and limiters 116, 120, respectively. The LPFs 114 and 118 remove the high frequency components of the output signals of the mixers 106 and 108. The outputs of the LPFs 114 and 118 are therefore the quadrature digital information signals 306 and 308. The limiters 116 and 120 limit the amplitudes of the analog quadrature signals 306 and 308 in order to produce their equivalent digital signals. The limiters 116 and 120 also remove noise and other undesired amplitude interferences that may be available at the output of the LPFs 114 and 118. The combination of mixers 106 and 108, the reference oscillator 112, filters 114 and 118, and limiters 116 and 120 forms the quadrature demodulator means 128 of the receiver 100. The outputs of the limiters 116 and 120 are connected to the first and second inputs of an exclusive OR (EXOR) 122. The EXOR 122 functions as the post-coder of the receiver 100 and decodes the quadrature signals 306 and 308 to result in signal 310. This signal 310 is subsequently coupled to an inverter 124. The output of the inverter 124 is signal 312 which is identical to the original transmitted signal 302. The combination of the EXOR 122 and the inverter 124 forms the EXOR means 126 of the receiver 100. The inverter 124 may include circuits for complementing the alternate bits of the output of the EXOR 122.

Referring now to FIG. 2 the transmitter 200 is shown in accordance with the present invention. The bit stream of the digital information signal 302 is generated by a data generator 202. This data generator may be the output of a voice digitizer, a computer peripheral, or any other device having a digital signal at its output. The output of the data generator 202 is connected to the first input of an exclusive OR (EXOR) 206. The second input of the EXOR 206 is connected to an inverting clock 204. This connection is made to provide the inversion of alternate bits of the bit stream of the output of the data generator 202. A synchronization line 203 is routed from the data generator 202 to the inverting clock 204. This line provides synchronization between data generator 202 and the inverting clock 204 in order to determine whether odd or even bits in the bit stream will be inverted. The combination of blocks 204 and 206 form a pre-coder 214. This pre-coder 214 is shown here to complement the even bits of the signal 302 resulting in the waveform 304. The output of the EXOR 206 is coupled to a pre-modulation filter 208 where noises added to the input signal 302 at the pre-coder 214 are removed. More importantly, this pre-modulation filter makes the transmit spectrum more compact by introducing inter symbol interference (ISI). The output of the pre-modulation filter 208 is coupled to a MSK modulator 210 where the signal 304 is serially modulated. The radio frequency signal of the modulator 210 is applied to an antenna 212 for transmission. The operation of serial modulators is well known in the art.

The inverter clock 204 may be synchronized via the synchronization line 203 to affect the inversion of the odd bits via the pre-coder 214. In the event that the odd bits are inverted the inverter 124 in the receiver 100 must be eliminated for the appropriate recovery of the digital information signal 302.

The pre-coding of the digital information signal 302 at the transmitter 200 is mainly aimed at removing the complexity of the post-coder 126 of the receiver 100. In fact the decoding of the quadrature demodulated signals 306 and 308 may be successfully accomplished if the post-coder 126 were replaced with a complex digital signal processing (DSP) unit. However this is costly and requires space which is scarce in receivers, especially portable ones. This situation is particularly true in systems were the number of receivers significantly overshadows the number of transmitters, such as in a paging system or a portable telephone system. Rather than using a complicated DSP as a decoder, this invention teaches a technique for the splitting of the function of the decoder. By placing part of the decoding in the transmitter, pre-coder 214, and leaving the rest on the receiver 126 a great deal of complexity has been avoided in the architecture of the receiver 100. The result of this split of decoding is that the pre-coder 214 places the data in the frequency (or phase) information of the waveform while the post-coder 126 reads it from the amplitude of the waveform.

Figure 4:
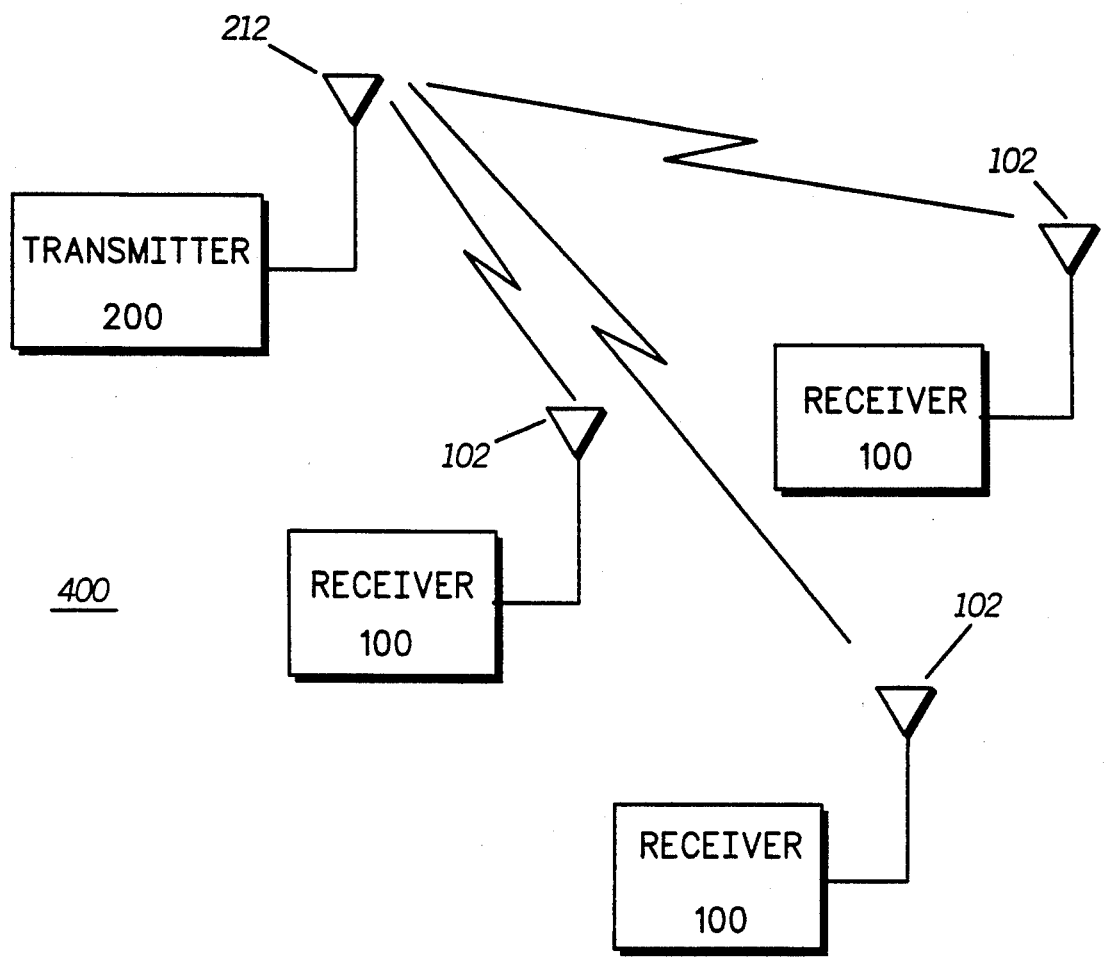
FIG. 4 is a block diagram of a communication system in accordance with the present invention.

Referring to FIG. 4, a block diagram of a communication system 400 is shown in accordance with the present invention. The communication system 400 includes the transmitter 200 with its associated antenna 212 and a plurality of receivers 100 and their associated antennas 102. In the communication system 400 the number of receivers may be significantly higher than shown. One example of such a system is a paging system where one or a limited number of transmitters are used to communicate with a large number of receivers. It is indeed for systems like this that the benefit of shifting the system cost to the transmitter rather than allowing it to be a part of the receivers makes a lot of economical sense.

To summarize an MSK modulation/demodulation scheme is disclosed wherein the data is placed in the frequency (or phase) information of the carrier signal and read from the amplitude of the recovered signal. For this reason the pre-coder 214 and the post-coder 122 are used in the transmitter 200 and the receiver 100 respectively. Decoding at the receiver is simply accomplished with an EXOR operation provided the transmitter signal has been predoded by complementing alternating bits. This approach greatly simplifies the receiver circuit resulting in lower cost. In communication systems such as a paging system where a significantly high number of receivers are used in conjunction with a limited number of transmitters (base stations) such a cost reduction is greatly desired.

What is claimed is:

1. A radio communication device, comprising:
    a receiver for receiving a minimum shift keying (MSK) modulated signal carrying a bit stream of a digital information signal having its alternate bits complemented via a pre-coder;
    a quadrature demodulator for demodulating the MSK modulated signal to produce a pair of baseband quadrature demodulated signals; and
    EXOR means for EXORing the pair of baseband quadrature demodulated signals for recovering the alternately complemented bits of the digital information signal.

2. The receiver of claim 1, wherein the quadrature demodulator means comprises:
    mixing means for providing two phase quadrature signals;
    filter means coupled to the mixing means for filtering the phase quadrature signals of the mixers; and
    limiter coupled to the filter means for limiting the filtered signals.

3. The receiver of claim 1, wherein the EXOR means includes an inverter.

4. In a receiver a method for recovering a signal comprising the steps of:
    receiving a carrier signal which is MSK modulated with a bit stream of a digital information signal having its alternate bits complemented via a pre-coder;
    quadrature demodulating the received carrier signal for providing a pair of quadrature demodulated signals; and
    EXORing the pair of quadrature demodulated signals for recovering the bit stream of the digital information signal.

5. The method of claim 4, wherein the step of EXORing the quadrature demodulated signal includes an inversion step.

6. The method of claim 4, wherein the step of quadrature demodulating the received carrier signal includes the steps of:
    quadrature mixing the received carrier signal;
    filtering the quadrature mixed signals for providing baseband quadrature signals; and
    limiting the filtered signals for providing quadrature signals with limited amplitudes.

7. A communication system comprising:

transmitter means for transmitting a carrier signal modulated with a digital information signal having a bit stream, comprising:
a pre-coder for complementing alternate bits of the bit stream of the digital information signal;
a MSK (minimum shift keying) modulator;
at least one receiver, including:
a receiver for receiving the carrier signal to produce a received signal;
a quadrature demodulator for demodulating the received signal to produce a pair of baseband quadrature demodulated signals; and
means for EXORing the pair of baseband quadrature demodulated signals for recovering the bit stream of the digital information signal.

8. The communication system of claim 7, wherein the quadrature demodulator means comprises:
mixing means for providing two phase quadrature signals;
filter means coupled to the mixing means for filtering the phase quadrature signals of the mixers; and
limiter means coupled to the filter means for limiting the filtering signals.

9. The communication system of claim 8, wherein the pre-coder includes means for complementing the even bits of the digital information signal.

10. The communication system of claim 8, wherein the pre-coder includes means for complementing the odd bits of the digital information signal.

* * * * *